(12) United States Patent
Mitra et al.

(10) Patent No.: US 7,220,690 B2
(45) Date of Patent: May 22, 2007

(54) GLASS CERAMIC HAVING A LOW THERMAL EXPANSION

(75) Inventors: Ina Mitra, Stadecken-Elsheim (DE); Jochen Alkemper, Klein-Winternheim (DE)

(73) Assignee: Schott AG, Mainz (DE)

( * ) Notice: Subject to any disclaimer, the term of this patent is extended or adjusted under 35 U.S.C. 154(b) by 63 days.

(21) Appl. No.: 11/052,581

(22) Filed: Feb. 7, 2005

(65) Prior Publication Data

US 2005/0197242 A1   Sep. 8, 2005

(30) Foreign Application Priority Data

Feb. 20, 2004   (DE) ................ 10 2004 008 824

(51) Int. Cl.
*C03C 10/12*   (2006.01)
*C03C 10/14*   (2006.01)

(52) U.S. Cl. .............. 501/4; 501/7; 65/33.5; 65/33.6; 65/61

(58) Field of Classification Search ............ 501/4, 501/7; 65/33.5, 33.6, 61
See application file for complete search history.

(56) References Cited

U.S. PATENT DOCUMENTS

| | | | | |
|---|---|---|---|---|
| 4,192,688 A * | 3/1980 | Babcock et al. | ........... | 501/7 |
| 4,851,372 A * | 7/1989 | Lindig et al. | ............ | 501/4 |
| 5,508,235 A * | 4/1996 | Marker | ............ | 501/7 |
| 5,591,682 A | 1/1997 | Goto | | |
| 6,673,729 B2 * | 1/2004 | Siebers et al. | ........... | 501/4 |
| 2003/0125184 A1 | 7/2003 | Mitra | | |

FOREIGN PATENT DOCUMENTS

| | | |
|---|---|---|
| DE | 1 596 860 | 9/1970 |
| DE | 1 902 432 | 9/1970 |
| EP | 0 437 288 A2 | 7/1991 |
| EP | 1 321 440 | 7/2003 |
| JP | 2001-150452 * | 6/2001 |
| WO | 03/016233 A1 | 2/2003 |

OTHER PUBLICATIONS

S. R. Wilson et al: "Surface Figuring Using Neutral . . ." SPIE vol. 966 Advances in Fabrication and Metrology for Optics and Large Optics, 1988, pp. 74-81.
Lynn N. Allen and Robert E. Keim: "An Ion Figuring System for . . ." SPIE vol. 1168 Current Developments in Optical Engineering and Commercial Optics 1989, pp. 33-50.
Lynn N. Allen and Henry W. Romig: "Demonstration of an Ion Figuring Process" SPIE vol. 1333 Advanced Optical Manufacturing and Testing, 1990, pp. 22-33.
R. Mueller et al: "Ultraprecision Dilatometer System for Thermal Expansion Measurements . . ." 12-th Thermal Expansion Symposium, Pittsburg, PA, P.S. Gaal and D.E. Apostolescu Eds., 1997, 5 Pages.
U. Dinger et al: "Mirror Substrates for EUV-Lithography: Progress in Metrology . . ." in Proc. SPIE vol. 4146, 2000, pp. 35-46.

* cited by examiner

*Primary Examiner*—Karl Group
(74) *Attorney, Agent, or Firm*—Michael J. Striker

(57) ABSTRACT

The present invention relates to a novel glass ceramic having a low or small average thermal expansion together with good polishability and processability, to the use of the glass ceramic according to the invention, and to optical components made of the glass ceramic. In particular, a glass ceramic is provided which comprises the following composition (in % by weight based on oxide):

| | |
|---|---|
| $SiO_2$ | 50–70 |
| $Al_2O_3$ | 17–32 |
| $P_2O_5$ | 3–12 |
| $Li_2O$ | 2.5–5 |
| $Na_2O$ | 0–2 |
| $K_2O$ | 0–2 |
| $MgO$ | 0–2 |
| $CaO$ | 0.1–4 |
| $BaO$ | 0–<1 |
| $SrO$ | 0–2 |
| $ZnO$ | 0–4 |
| $TiO_2$ | 1.5–5 |
| $ZrO_2$ | 0–2.5. |

14 Claims, 1 Drawing Sheet

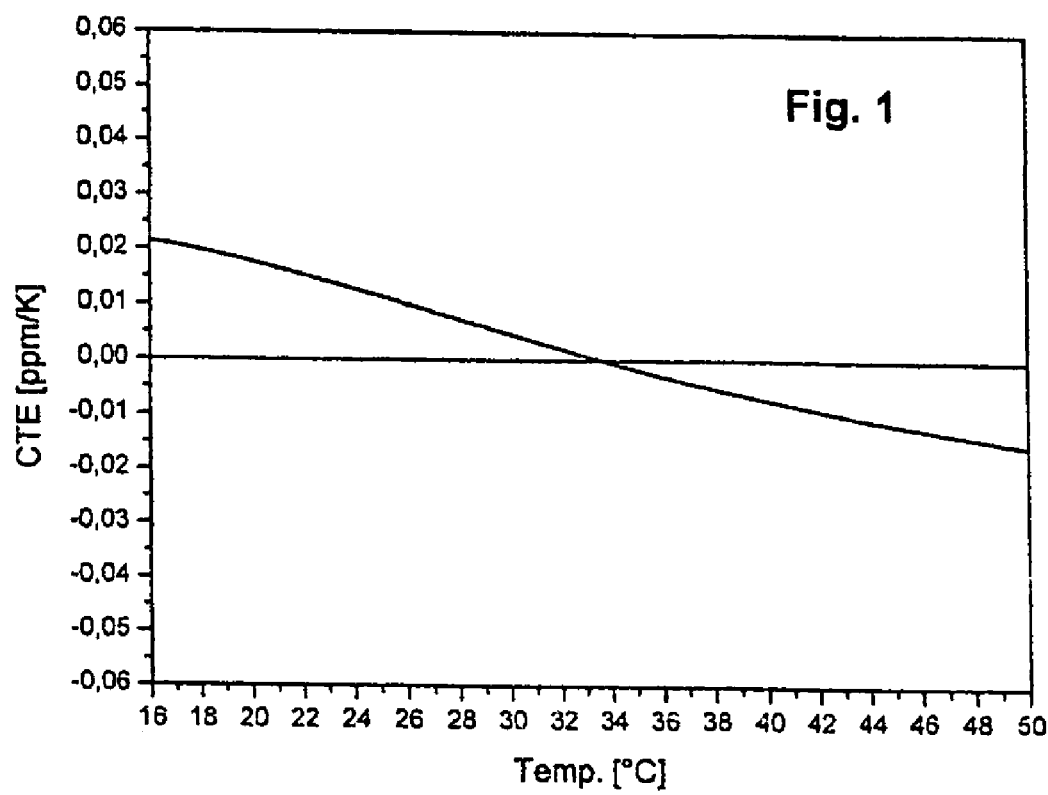
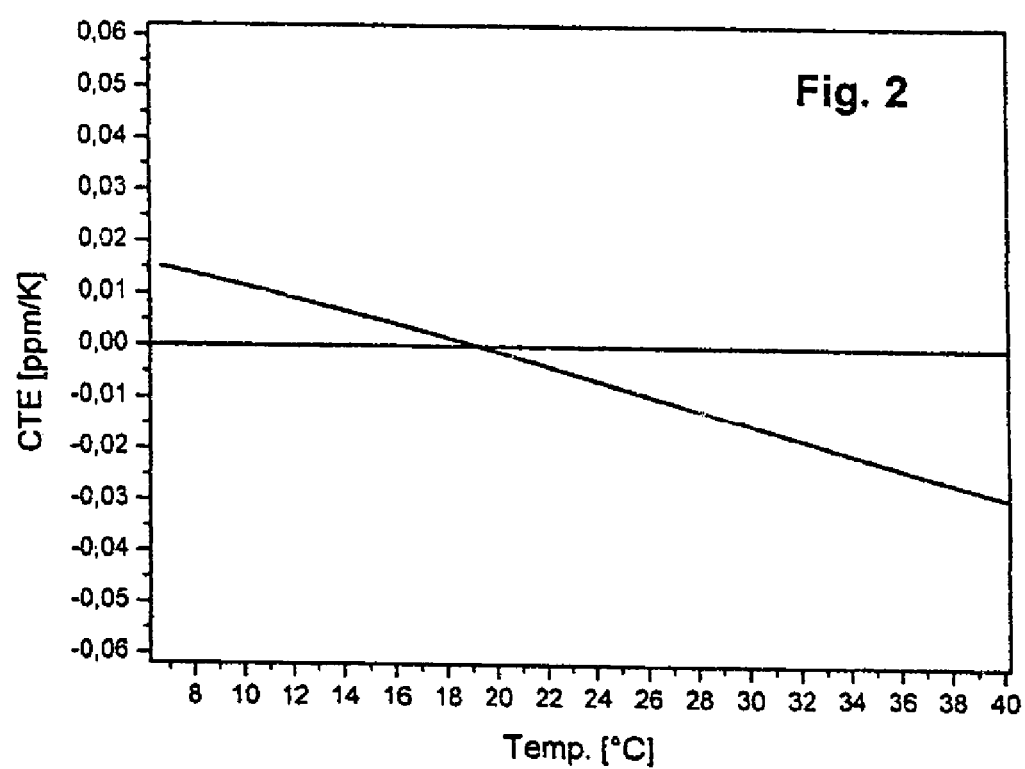

GLASS CERAMIC HAVING A LOW THERMAL EXPANSION

The present invention relates to a novel glass ceramic having a low average thermal expansion together with good polishability and processability, to the use of the glass ceramic according to the invention, and to optical components made of the glass ceramic.

BACKGROUND OF THE INVENTION

Glass ceramics having a low average thermal expansion or low average CTE ("coefficient of thermal expansion") are already known in the prior art.

The average CTE is always specified for a particular temperature interval, this temperature interval being selected around the working temperature of the glass ceramic. Only if the average CTE in such a temperature interval around the working temperature is low enough can the intended dimensional stability be ensured when heating in the working temperature range.

Glass ceramics which are intended for use as a cooktop plate or stove window therefore have their composition adjusted to low expansion in the range of up to about 700° C. For example, the commercial glass ceramics for stove windows, for example Keralite® (described in EP 437 228) (Corning) or Robax® (SCHOTT) have average coefficients of thermal expansion of $0\pm0.3\times10^{-6}$/K in the range of from 20° C. to 700° C. For a temperature range of from 0 to 50°, however, the values of the average CTE are only about $-0.57\times10^{-6}$/K (Robax®) and about $-0.4\times10^{-6}$/K (Keralite®).

Among the glass ceramics with particularly low thermal expansion, lithium aluminium silicate (LAS) glass ceramics are known as so-called "zero expansion materials".

DE 1 596 860 and DE 1 902 432 relate to transparent glass ceramics of the $Li_2O$—$Al_2O_3$—$SiO_2$ system, and in particular Zerodur®, as well as to shaped glass-ceramic articles made of them. These glass ceramics do not contain any CaO.

The glass ceramics described in U.S. Pat. No. 4,851,372 (Lindig and Pannhorst) contain at least 1% by weight of BaO and also comprise Zerodur®M.

The glass ceramics mentioned in U.S. Pat. No. 5,591,682 (Goto et al.) comprise the commercial glass ceramic Clearceram®Z and contain relatively high BaO contents, which can have a negative effect on the processability of the glass ceramic.

Zerodur® is available as a commercial product in the following three expansion classes:
expansion class 2 CTE(0;+50° C.) $0\pm0.10\times10^{-6}$/K
expansion class 1 CTE(0;+50° C.) $0\pm0.05\times10^{-6}$/K
expansion class 0 CTE(0;+50° C.) $0\pm0.02\times10^{-6}$/K, the selected temperature range of from 0 to 50° C. comprising, for example, the working temperature range of mirror supports.

Modern requirements for different applications and therefore different working temperatures usually stipulate even more specific instructions relating to the thermal expansion behaviour.

An example which may be mentioned from EUV lithography is the expansion specification for mask substrates according to the specification SEMI Standard P37: the average CTE should not exceed 5 ppb/K, i.e. $0.005\times10^{-6}$/K, in the range of from 19 to 25° C.

Substrates based on glass ceramic, as are described in EP 1 321 440, have been developed for such stringent specifications. This document describes how, particularly in the case of Zerodur®, the average CTE can be set even more accurately by controlled re- or post-ceramizing of the glass ceramic so that the aforementioned specifications for mask substrates can be achieved. It also describes that it is preferable and possible to shift the zero crossing of the CTE-T curve into the application temperature range, for example to a value in the range of from 15 to 35° C., and/or to set a particularly small gradient of the CTE-T curve at the zero crossing, for example less than 5 ppb/$K^2$.

It has now been found that although Zerodur® seems particularly suitable as a substrate for EUV lithography owing to the good adjustability of the CTE, this glass ceramic has certain disadvantages in respect of the requisite processability of the substrates.

Mirrors for EUV lithography comprise a substrate covered with a multiple layer system, or multilayer, which makes it possible to produce mirrors with high reflectivity in X-ray range. A necessary prerequisite for achieving a high reflectivity is sufficiently low layer and substrate roughnesses in the mid and high spatial frequency roughness ranges (MSFR and HSFR).

For the definition of fine surface figure error, MSFR and HSFR, reference is made to the publication "Mirror substrates for EUV lithography: progress in metrology and optical fabrication technology" U. Dinger, F. Eisert, H. Lasser, M. Mayer, A. Seifert, G. Seitz, S. Stacklies, F. J. Stiegel, M. Weiser, in Proc. SPIE Vol. 4146, 2000. The HSFR comprises wavelengths of from 10 nm to 1 µm, and the MSFR comprises wavelengths of from 1 µm to 1 mm.

Defects on the substrate surface in the HSFR range lead to light losses by scattering out of the image field of the optics, or perturbation in the superposition of the wavetrain components. The HSFR is usually measured by atomic force microscopes (AFM) which have the necessary resolution.

A sufficient value of the surface roughness in the HSFR range for EUV lithography, for example 0.1 nm rms, can be achieved by conventional superpolishing methods even for glass ceramics such as Zerodur®. Since these methods generally deteriorate the fine surface figure error and/or the MSFR at least on aspheres, that is to say they produce defects in the low spatial frequency range and in the long-wave MSFR range, the superpolishing process generally has to be followed by a fine correction process. To this end, for example, the fine surface figure error and the long-wave MSFR components are brought into specification by beam processing methods, for example ion beam figuring (IBF). The advantage of this method is that such tools can fit accurately to the shape of, in particular, the typically aspherical surfaces. Such processing methods are based on sputtering processes. The sputtering rates depend on the chemical and physical bonding conditions in the solid body to be processed.

In commercial glass ceramics, the extra energy introduced by the beam processing method into the solid body to be processed can impair the surface roughness in the HSFR range. With Zerodur®, for example, a deterioration in the HSFR range of from 0.1 nm rms after superpolishing to 0.4 nm rms after IBF can be observed.

This problem is addressed in WO 03/016233 by proposing glass ceramics which contain microcrystallites with a small average size, i.e. substantially less than 50 nm, as substrate materials of X-ray optical components for EUV lithography. According to this document, the requisite roughness in the high spatial frequency range HSFR can thus be achieved after IBF.

With novel glass ceramics, there is therefore a need that they should not only have a low thermal expansion but also that this should be adjustable in a controlled way for different applications, and good processability should be achievable at the same time with a view to even better surface quality in respect of both fine surface figure error, MSFR and in particular HSFR. It is therefore an object of the present invention to provide a novel glass ceramic and optical elements or precision components made of it, with which the aforementioned problems can be overcome. In particular, such optical elements and precision components should have a very low surface roughness even after final processing steps such as IBF. It should preferably also be possible to adjust the zero crossing of the CTE-T curve, and the gradient of the CTE-T curve should also be as small as possible.

SUMMARY OF THE INVENTION

According to the first aspect of the present invention, a glass ceramic is provided which comprises the following composition (in % by weight based on oxide):

| | |
|---|---|
| $SiO_2$ | 50–70 |
| $Al_2O_3$ | 17–32 |
| $P_2O_5$ | 3–12 |
| $Li_2O$ | 2.5–5 |
| $Na_2O$ | 0–2 |
| $K_2O$ | 0–2 |
| MgO | 0–2 |
| CaO | 0.1–4 |
| BaO | 0–<1 |
| SrO | 0–2 |
| ZnO | 0–4 |
| $TiO_2$ | 1.5–5 |
| $ZrO_2$ | 0–2.5 |

According to a second aspect, a method of using of glass ceramic in lithography, microlithography, astronomy, metrology, as a precision component or for spectroscopy is provided wherein said glass ceramic has a coefficient of thermal expansion CTE of at most $0\pm0.5\times10^{-6}$/K in the range of from 0 to 50° C., and which comprises the following composition (in % by weight based on oxide):

| | |
|---|---|
| $SiO_2$ | 50–70 |
| $Al_2O_3$ | 17–32 |
| $P_2O_5$ | 3–12 |
| $Li_2O$ | 2.5–5 |
| $Na_2O$ | 0–2 |
| $K_2O$ | 0–2 |
| MgO | 0–2 |
| CaO | 0.1–4 |
| BaO | 0–<1 |
| SrO | 0–2 |
| ZnO | 0–4 |
| $TiO_2$ | 1.5–5 |
| $ZrO_2$ | 0–2.5 |

According to a third aspect, an optical component is provided comprising a substrate which comprises a glass ceramic which has a coefficient of thermal expansion CTE of at most $0\pm0.5\times10^{-6}$/K in the range of from 0 to 50° C., and which comprises the following composition (in % by weight based on oxide):

| | |
|---|---|
| $SiO_2$ | 50–70 |
| $Al_2O_3$ | 17–32 |
| $P_2O_5$ | 3–12 |
| $Li_2O$ | 2.5–5 |
| $Na_2O$ | 0–2 |
| $K_2O$ | 0–2 |
| MgO | 0–2 |
| CaO | 0.1–4 |
| BaO | 0–<1 |
| SrO | 0–2 |
| ZnO | 0–4 |
| $TiO_2$ | 1.5–5 |
| $ZrO_2$ | 0–2.5 |

According to a fourth aspect, a method for producing an optical component is provided, comprising the steps:
providing a substrate for an optical element which comprises a glass ceramic which has a coefficient of thermal expansion CTE of at most $0\pm0.5\times10^{-6}$/K in the range of from 0 to 50° C.,
superpolishing the surface of the substrate to a surface roughness HSFR of at most 0.5 nm rms,
processing the superpolished surface by a beam processing method to a fine surface figure error of at most 0.5 nm rms, and a surface roughness MSFR of at most 0.5 nm rms, the surface roughness HSFR being substantially undeteriorated even after the end of this processing step, and in particular still being at most 0.5 nm rms.

These and other aspects and objects, features and advantages of the present invention will become apparent upon a consideration of the following detailed description and the invention when read in conjunction with the drawing Figures.

It is to be understood that both the forgoing general description and the following detailed description as well as the examples are merely exemplary of the invention, and are intended to provide an overview or framework for understanding the nature and character of the invention as claimed.

BRIEF DESCRIPTION OF THE DRAWINGS

In the Figures:
FIGS. 1 and 2 show CTE-T curves of glass ceramics according to Examples 5 and 6.

DETAILED DESCRIPTION OF THE PREFERRED EMBODIMENTS

Here, the term glass ceramic refers to nonporous inorganic materials having a crystalline phase and a vitreous phase, the matrix i.e. the continuous phase generally being a vitreous i.e. glass phase.

The invention preferably relates to a glass ceramic having a low average coefficient of thermal expansion or CTE.

In this context, the term "low average CTE" is intended to mean a value of at most $0\pm0.5\times10^{-6}$/K, preferably at most $0\pm0.3\times10^{-6}$/K, more preferably at most $0\pm0.1\times10^{-6}$/K, most preferably at most $0\pm0.05\times10^{-6}$/K which is measured in a temperature range around the working temperature $T_A$, in particular an average CTE $[T_A-100°; T_A+100°]$, more preferably average CTE $[T_A-50° C.; T_A+50° C.]$, most preferably average CTE $[T_A-25° C.; T_A+25° C.]$, for example average CTE $[0;50]$.

In what follows, the expression "X-free" or "free of a component X" means that the glass ceramic essentially does not contain this component X, i.e. such a component is present at most as an impurity in the glass and is not added as to the composition a separate component. X may stand for any component in this context, for example BaO.

The glass ceramic belongs to the group of glass ceramics having a structure in which the crystal phase or crystalline phase has a negative linear thermal expansion, while that of the vitreous phase or the glass phase is positive. The particular combination of the base glass of the glass ceramic, defined crystal nucleation and defined crystallization conditions then result in a material having an extremely low thermal expansion.

Since the crystal phase of a glass ceramic determines the expansion behaviour to a large extent, the expansion value of the material depends on the structural state of the crystalline phase. The crystal phase of the glass ceramic in turn depends on the one hand on the composition, and on the other hand on the ceramizing conditions.

The glass ceramic is a novel glass ceramic in the $Li_2O$—$Al_2O_3$—$SiO_2$ system.

The glass ceramic contains a proportion of from 50 to 70% by weight of $SiO_2$. The proportion of $SiO_2$ is preferably at most 65% by weight, more preferably at most 60% by weight. The proportion of $SiO_2$ is preferably at least 52% by weight, more preferably at least 54% by weight.

The proportion of $Al_2O_3$ is from 17 to 32% by weight. The glass ceramic preferably contains at least 20% by weight, more preferably at least 22% by weight of $Al_2O_3$. The proportion of $Al_2O_3$ is preferably at most 30% by weight, more preferably at most 28% by weight.

The phosphorus content $P_2O_5$ of the glass ceramic is from 3 to 12% by weight. The glass ceramic preferably contains at least 4% by weight, more preferably at least 5% by weight of $P_2O_5$. The proportion of $P_2O_5$ is preferably limited to at most 10% by weight, more preferably to at most 8% by weight.

The glass ceramic furthermore contains $TiO_2$ in a proportion of from 1.5% by weight to 5% by weight, and it preferably contains at least 2% $TiO_2$. The proportion is however preferably restricted to at most 4% by weight, more preferably to at most 3% by weight.

The glass ceramic may furthermore contain $ZrO_2$ in a proportion of at most 2.5% by weight. It preferably contains $ZrO_2$ in a proportion of at least 0.5% by weight, more preferably at least 1% by weight.

The glass ceramic may furthermore contain alkali metal oxides, such as $Li_2O$, $Na_2O$ and $K_2O$.

$Li_2O$ is contained in a proportion of at least 2.5% by weight, preferably at least 3% by weight. The proportion of $Li_2O$ is limited to 5% by weight, preferably 4% by weight.

$Na_2O$ and $K_2O$ are only optionally contained in the glass ceramic, and addition of these components is not preferred, particularly in the case of $K_2O$. Contrary to earlier publications, however, minor amounts of $K_2O$ and $Na_2O$ in the glass ceramic, such as may be contained by impurities in raw materials, do not cause any deterioration of the polishability. This offers the advantage that less refined and therefore less expensive raw materials can also be used for producing the glass ceramic than is necessary for conventional glass ceramics. The glass ceramic may therefore contain $Na_2O$ and $K_2O$ as impurities in a total proportion of at most 0.3% by weight.

According to a particular embodiment of the invention, $Na_2O$ and/or $K_2O$ may also be added as components of the glass composition when melting the green glass. In such a case, however, their proportions are respectively and independently of each other limited to at most 2% by weight, preferably at most 1% by weight, most preferably at most 0.5% by weight. According to this embodiment, $Na_2O$ and $K_2O$ are respectively and independently of each other contained in the glass ceramic in a proportion of at least 0.01% by weight, preferably at least 0.02% by weight, more preferably at least 0.05% by weight.

According to another embodiment, however, in particular when the glass ceramic according to the invention is intended to be finished by an IBF method, the proportion of $K_2O$ is preferably at most 0.2% by weight and the glass ceramic is more preferably $K_2O$-free. It has been found that $K_2O$ can have a negative effect on the surface roughness in the HSFR range after IBF processing.

The glass ceramic may furthermore contain alkaline earth metal oxides such as MgO, CaO and BaO as well as other oxides of divalent metals such as ZnO.

The proportion of CaO is from 0.1 to 4% by weight. Preferably at most 3% by weight, more preferably at most 2% by weight of CaO are contained in the glass ceramic. The glass ceramic preferably contains at least 0.5% by weight, more preferably at least 1% by weight of CaO. Surprisingly, it has been found that CaO has a positive effect on the finishability, for example by IBF. CaO contents of at least 1% by weight have a particularly positive effect on the finishability.

MgO may be contained in the glass ceramic in a proportion of at most 2% by weight, preferably at most 1% by weight, particularly preferably less than 0.9% by weight.

It has been established that even minor amounts of MgO have an advantageous effect on the gradient of the CTE-T curve at the zero crossing, i.e. such glass ceramics generally have a lower gradient of the CTE-T curve at the zero crossing. In applications for which such a low value of the gradient of the CTE-T curve at the zero crossing is desired, the glass ceramic therefore preferably contains MgO in a proportion of at least 0.1% by weight, more preferably at least 0.2% by weight.

Surprisingly, it has been found that BaO contents of 1% by weight or more have a negative effect on the finishability, for example by IBF. The glass ceramic therefore contains BaO in a proportion of less than 1% by weight, preferably at most 0.5% by weight. According to preferred embodiments, the glass ceramic is BaO-free.

According to a special embodiment of the present invention, the glass ceramic may contain up to 1% by weight of BaO, although the sum of $P_2O_5$ and BaO should not exceed a value of 7.4% by weight in this case. It has been found that with such a limitation on the sum of $P_2O_5$ and BaO, in contrast to other compositions containing BaO, the finishability does not suffer from the BaO content.

As a further metal oxide, the glass ceramic preferably contains ZnO in a proportion of preferably at least 0.3% by weight, more preferably at least 0.5% by weight and most preferably at least 1.0% by weight. The proportion of ZnO is limited to at most 4% by weight, preferably at most 3% by weight and most preferably to at most 2% by weight.

The glass ceramic may furthermore contain standard refining agents, such as $As_2O_3$, $Sb_2O_3$, SnO, $SO_4^{2-}$, $F^-$, in a proportion of at most 1% by weight.

According to another embodiment of the present invention, the glass ceramic is free of any components which have not been mentioned within this application. According to a further embodiment, the glass ceramic essentially consists of the aforementioned components, optionally excluding one or more components which have been mentioned above as less preferable.

The glass ceramic is preferably free of environmentally harmful or toxic components such as lead, arsenic, etc.

The working temperature $T_A$ may lie in different temperature ranges, depending on the application of the glass ceramic. For example, temperatures in the room temperature range are typical for applications in EUV microlithography and metrology, whereas temperatures even far below zero are not uncommon in astronomy.

The zero crossing of the CTE-T curve of the glass ceramic can preferably be adjusted to a range close or equal to the working temperature $T_A$, in particular to a value of $T_A \pm 10$ K, more preferably $T_A \pm 5$ K. According to one embodiment of the present invention, the glass ceramic has at least one zero crossing in the temperature range of from 0 to 50° C., preferably in the temperature range of from 19 to 35° C.

The CTE-T curve of the glass ceramic preferably has a gradient $\leq 5$ ppb/K$^2$ at the zero crossing, more preferably $\leq 2.5$ ppb/K$^2$, even more preferably $\leq 2$ ppb/K$^2$.

The glass ceramic according is preferably stepwise ceramizable, i.e. the ceramizing may be interrupted and continued after the glass ceramic has fully cooled.

The present invention furthermore relates to the use of a glass ceramic as described above in microlithography, spectroscopy, metrology, for example for final dimensioning, and/or in astronomy, for example as a substrate for mirrors or precision components.

The present invention furthermore relates to optical components comprising a substrate which comprises the glass ceramic as described above.

The CTE of the glass ceramic, when used as an optical component, is preferably matched to the working temperature of the optical component. In particular, the CTE-T curve may have at least one zero crossing in a range of $T_A \pm 10$ K, preferably $T_A \pm 5$ K. The temperature $T_A$ preferably lies in a range of from 0 to 50° C., more preferably in a range of from 10 to 40° C., particularly preferably in a range of from 19 to 35° C.

Such a component may, for example, be a mirror such as a so-called normal incidence mirror, that is to say a mirror which is operated close to perpendicular radiation incidence, or a so-called grazing incidence mirror, that is to say a mirror which is operated with glancing radiation incidence. Besides the substrate, such a mirror comprises a coating which reflects the incident radiation. Especially in the case of a mirror for X-radiation, the reflective coating may for example be a multiple layer system, or multilayer, with a multiplicity of layers having high reflectivity for non-grazing incidence in the X-ray range. Such a multiple layer system of a normal incidence mirror preferably comprises from 20 to 400 layer pairs, consisting e.g. of alternate layers of one of the material pairs Mo/Si, Mo/Bi and/or MoRu/Be.

Furthermore, the optical component may be a reticle mask operated in reflection or a photomask, in particular for EUV microlithography.

Such optical elements are in particular X-ray optical elements, that is to say optical elements which are used in conjunction with X-radiation, in particular soft X-radiation or EUV radiation.

A normal incidence mirror for EUV lithography preferably has a good fine surface figure error, that is to say little or no defects in the low spatial frequency range. This typically means structural sizes of between one tenth of the beam cross section through the individual pixels up to the free diameter of the mirror, that is to say the defects would be of the order of millimetres to several decimetres. Such defects lead to aberrations and reduce the imaging accuracy or limit the resolution of the system. With the optical components, it is possible to achieve fine surface figure errors of preferably at most 0.5 nm rms in the EUV range, that is to say at wavelengths of from 10 to 30 nm, in particular around 13.4 nm.

The optical components are furthermore distinguished by preferably low roughnesses in the medium spatial frequency range MSFR (about 1 mm to 1 μm). Defects in this spatial frequency range lead to scattered light within the image field (flare) and therefore to contrast losses in imaging optics. The optical components can achieve a surface roughness of preferably at most 0.5 nm rms in the MSFR range for EUV applications.

The optical components also in particular have a low roughness in the high spatial frequency range HSFR (about 1 μm to 10 nm and less). Defects in this spatial frequency range lead to light losses by scattering out of the image field of the optics, or perturbation in the microscopically phase-oriented superposition of the wavetrain components in reflective multilayer systems, and therefore to a loss during reflection. The optical components can achieve a surface roughness of preferably at most 0.5 nm rms in the HSFR range for EUV applications.

The aforementioned maximum roughnesses, respectively of at most 0.5 nm rms, are preferably achieved simultaneously for both the fine surface figure error, the MSFR and the HSFR in the optical components.

The optical components furthermore have a low average thermal expansion as defined above. This is important particularly for EUV lithography, since about 30% of the incident X-radiation is absorbed by the reflective multiple layers and converted into heat. In order to ensure dimensional stability under these thermal loads, it is necessary to have a CTE of close to zero.

A method for producing such optical components according to the invention, in particular mirrors for EUV lithography, preferably comprises the following steps:
  providing a substrate for an optical element which comprises a glass ceramic which has a coefficient of thermal expansion CTE of at most $0 \pm 0.5 \times 10^{-6}$/K in the range of from 0 to 50° C.,
  superpolishing the surface of the substrate to a surface roughness HSFR of at most 0.5 nm rms, preferably at most 0.3 nm rms,
  processing the superpolished surface by a beam processing method to a fine surface figure error of at most 0.5 nm rms, preferably at most 0.3 nm rms, and a surface roughness MSFR of at most 0.5 nm rms, preferably at most 0.3 nm rms, the surface roughness HSFR being substantially undeteriorated even after the end of this processing step, and in particular still being at most 0.5 nm rms, preferably at most 0.3 nm rms.

Superpolishing is well known in the prior art. Examples of such superpolishing are described in "Mirror substrates for EUV lithography: progress in metrology and optical fabrication technology" U. Dinger, F. Eisert, H. Lasser, M. Mayer, A. Seifert, G. Seitz, S. Stacklies, F. J. Stiegel, M. Weiser, in Proc. SPIE Vol. 4146, 2000, the content of which is fully incorporated into the present application.

An example of a beam processing method which may be mentioned is ion beam figuring (IBF), which is described in L. Allen and H. W. Romig "Demonstration of ion beam figuring processes" in SPIE Vol. 1333 (1990), page 22; S. R. Wilson, D. W. Reicher, J. R. McNell "Surface figuring using neutral ion beams", Advances in Fabrication and Metrology for Optics and large Optics", in SPIE Vol. 966, pages 74 to 81, August 1888 and L. N. Allen and R. E. Keim "An ion beam figuring system for large optics fabrication", Current Developments in Optical Engineering and Commercial Optics, SPIE Vol. 1168, pages 33 to 50, August 1989, the disclosure content of which is fully incorporated into the present application.

The present invention will be explained in more detail below by examples according to the invention and comparative examples. However, the invention is in no way limited to the examples which are given.

EXAMPLES

Determination of CTE Values and CTE-T Curves

In glass ceramics, the average CTE is generally specified for a temperature range and can be determined by means of the following Equation (1):

$$CTE[t_0;t]=(1/l_0)\times(l_t-l_0)/(t-t_0)=\Delta l/(l_0\times\Delta t) \quad (1)$$

where $t_0$ is the initial temperature, t is the measuring temperature, $l_0$ the sample body length at the initial temperature $t_0$, $l_t$ is the sample body length at the measuring temperature t and $\Delta l$ is the corrected length change of the sample body for a temperature change $\Delta t$.

In order to determine an average CTE, the length of a sample body of a glass ceramic is measured at an initial temperature $t_0$, the sample body is heated to a second temperature t and the length $l_t$ at this temperature is measured. The above Formula (1) gives the average $CTE[t_0;t]$ for the temperature range $t_0$ to t. The thermal expansion may be determined by means of dilatometry, that is to say determining the length change of a measurement sample as a function of temperature. A measurement layout for determining the average CTE is described, for example, in R. Mueller, K. Erb, R. Haug, A. Klaas, O. Lindig, G. Wetzig: "Ultraprecision Dilatometer System for Thermal Expansion Measurements on Low Expansion Glasses", 12$^{th}$ Thermal Expansion Symposium, Pittsburgh/Pa., P. S. Gaal and D. E. Apostolescu Eds., 1997, the content of which is fully incorporated into the present application.

Besides this conventional determination of the average CTE, a CTE determination as indicated in the EP 1 321 440 was carried out in the examples for the glass ceramic according to the invention, because the true CTE at a particular temperature may be given incorrectly when considering the average CTE in a temperature interval. A CTE-T curve oscillating around the zero line may suggest a low average CTE, even though the "true CTE" at the working temperature may lie outside specifications. The content of EP 1 321 440 is fully incorporated into the present application.

The "true CTE" at a particular temperature is intended to mean and the value lying on a CTE-T curve at this temperature.

The CTE is determined as a function of temperature for this measuring measurement method. The (longitudinal) coefficient of thermal expansion CTE, or $\alpha$, is then defined according to Formula (2) below $$CTE(T)=(1/l_0)\times(\partial l/\partial T) \quad (2)$$

In order to compile a $\Delta l/l_0$-T curve, or an expansion curve, i.e. a plot of the length change $\Delta l/l_0$ of a sample body against temperature, the temperature-dependent change of the length of a sample body from the initial length $l_0$ at the initial temperature $t_0$ to the length $l_t$ at the temperature t may be measured. Small temperature intervals, for example 5° C. or 3° C., are preferably selected for determining a measurement point in this case.

Such measurements may, for example, be carried out by dilatometric methods, interferometric methods, for example the Fabry-Perot method, that is to say evaluating the shift of the resonant peak of a laser beam shone into the material, or other suitable methods.

The method selected for determining the $\Delta l/l_0$-T measurement points preferably has an accuracy of at least ±0.10 ppm, more preferably ±0.05 ppm, most preferably ±0.01 ppm.

The measurement values obtained from the measurement are plotted against one another, and an n$^{th}$ order polynomial, for example a 4$^{th}$ order polynomial, is fitted through the $\Delta l/l_0$-T measurement values or points so as to obtain the best match between the measurement points and the polynomial. A 3$^{rd}$ to 6$^{th}$ order polynomial is preferably used. A 3$^{rd}$ order polynomial is often variable enough to fit the measurement values with sufficient accuracy. Higher order polynomials, for example 8$^{th}$ order polynomials, generally exhibit an "oscillation" which in general is inappropriate for the measurement values. The measurement values may be pottered together with the selected polynomial in a $\Delta l/l_0$-T diagram.

It is furthermore preferable to select the polynomial suitably, in particular, for the temperature range $T_A$±100° C., more preferably $T_A$±50° C., most preferably $T_A$±25° C.

The CTE-T curve is subsequently obtained by differentiating the selected polynomial. The zero crossing of the CTE-T curve and the gradient of the CTE-T curve at the zero crossing can be determined from this curve.

Preparation of Green Glasses of Glass Ceramics According to the Invention

The glass compositions listed in Table 1 were melted by a standard production method from commercially available raw materials such as oxides, carbonates and nitrates.

TABLE 1

Compositions (analysis of the glass ceramic, % by weight based on oxide)

|  | Ex. 1 | Ex. 2 | Ex. 3 | Ex. 4 | Ex. 5 | Ex. 6 |
|---|---|---|---|---|---|---|
| $SiO_2$ | 56.90 | 57.70 | 57.00 | 56.30 | 56.00 | 55.85 |
| $Al_2O_3$ | 24.75 | 23.75 | 24.60 | 25.15 | 24.70 | 24.80 |
| $P_2O_5$ | 6.65 | 5.35 | 7.05 | 7.25 | 7.20 | 6.65 |
| $Li_2O$ | 3.60 | 3.60 | 3.65 | 3.60 | 3.50 | 3.40 |
| $Na_2O$ | 0.05 | 0.20 | 0.05 | 0.05 | 0.05 | 0.30 |
| $K_2O$ | — | 0.10 | — | 0.10 | — | — |
| MgO | — | — | — | — | 0.70 | 0.40 |
| CaO | 1.95 | 2.05 | 1.85 | 1.85 | 1.80 | 2.90 |
| BaO | — | 0.85 | — | — | — | — |
| SrO | — | — | — | — | — | 0.60 |
| ZnO | 1.40 | 1.60 | 1.10 | 1.00 | 1.40 | 1.40 |
| $TiO_2$ | 2.30 | 2.35 | 2.30 | 2.30 | 2.25 | 2.25 |
| $ZrO_2$ | 1.95 | 1.90 | 1.95 | 1.95 | 1.90 | 1.75 |
| $As_2O_3$ | 0.45 | 0.55 | 0.45 | 0.45 | 0.50 | 0.60 |
| Σ | 100.00 | 100.00 | 100.00 | 100.00 | 100.00 | 100.00 |

Ceramization

All the green glasses prepared according to Table 1 were first ceramized at a maximum temperature of 770° C. for 5 days. The CTE values achieved by this ceramization are given in Table 2.

TABLE 2

Standard ceramization

| | Ex. 1 | Ex. 2 | Ex. 3 | Ex. 4 | Ex. 5 | Ex. 6 |
|---|---|---|---|---|---|---|
| Ceramization: | | | | | | |
| Temperature [° C.] | 770 | 770 | 770 | 770 | 770 | 770 |
| Duration [days] | 5 | 5 | 5 | 5 | 5 | 5 |
| CTE(0; +50) [$10^{-6}$/K] | −0.189 | −0.306 | −0.030 | −0.067 | +0.022 | +0.013 |

Table 2 shows that good to very good CTE values for the glass ceramics of Examples 3 to 6 are already achieved with this ceramization temperature and duration.

In order to obtain a more accurate adjustment of the CTE values, a set of curves of different ceramized samples was subsequently compiled as described in EP 1 321 440 for each of the glass ceramic compositions in order to be able to assess the variation of the CTE-T curves with longer or shorter ceramization times, and higher or lower ceramization temperatures. It was found that all the glass ceramics of Examples 1 to 6 behaved similarly as Zerodur®, that is to say the CTE(0;50) value in the temperature interval of from 0 to 50° C. can be increased by higher ceramization temperatures and longer ceramization times.

In view of this result, the CTE values of Examples 1 and 2 which lie relatively far in the negative range according to Table 2 can be improved by longer ceramization times and/or higher ceramization temperatures. An improvement in the CTE values of Examples 5 and 6, which already lie in the positive range, is likewise to be expected from shorter ceramization times and/or lower ceramization temperatures.

These findings were used in order to carry out the refined ceramization experiments as presented in Table 3. The ceramization was furthermore carried out in two ceramization steps in the case of Examples 1 to 3 and 6, i.e. pre-ceramming and re-ceramming.

TABLE 3

Refined ceramization

| | Ex. 1 | Ex. 2 | Ex. 3 | Ex. 4 | Ex. 5 | Ex. 6 |
|---|---|---|---|---|---|---|
| Ceramization: | | | | | | |
| Temperature [° C.] | 780 | 780 | 770 | 770 | 776 | 770 |
| Pre-c. [days] | 2.5 | 2.5 | 2.5 | | | 1 |
| Re-c. [days] | 5 | 2.5 | 5 | | | 1 |
| total [days] | 7.5 | 5 | 7.5 | 5 | 1 | 2 |
| CTE(0; +50) [$10^{-6}$/K] | | | | | | |
| after pre-c. | −0.150 | −0.316 | −0.062 | — | — | −0.024 |
| after end-c. | −0.074 | −0.281 | −0.028 | −0.067 | −0.007 | −0.012 |
| as Table 2 | −0.189 | −0.306 | −0.030 | −0.067 | +0.022 | +0.013 |

Zero Crossing of the CTE-T Curves, Gradient at the Zero Crossing

Table 4 shows the respective zero crossings of the CTE-T curves which were obtained for the glass ceramics of Examples 1 and 3 to 6 with the ceramization conditions as given in Table 4. For these glass ceramics, in particular, the zero crossing can be adjusted to the range around room temperature (19 to 35° C.) which, for example, permits use as components for EUV lithography.

TABLE 4

Zero crossing of the CTE-T curve

| | Ex. 1 | Ex. 3 | Ex. 4 | Ex. 5 | Ex. 6 |
|---|---|---|---|---|---|
| Ceramization | | | | | |
| Temp [° C.] | 780 | 770 | 770 | 760 | 770 |
| total [days] | 7.5 | 7.5 | 5 | 1 | 2 |
| CTE(0; +50) [$10^{-6}$/K] | −0.074 | −0.028 | −0.067 | −0.007 | −0.024 |
| CTE-T zero crossing [° C.] | 19.6 | 22.9 | 21.5 | 33.6 | 19.3 |

The glass ceramics of Examples 3 and 4 furthermore meet the Class A specification of the CTE(19;25) for EUVL photomasks, namely <5 ppb/K, with −4.9 ppb/K (Example 3) and even 0.45 ppb/K (Example 4).

The gradient of the CTE-T curve at the zero crossing was furthermore determined for the glass ceramics of Examples 5 and 6 ceramized under the conditions given in Table 4. The CTE-T curves are shown in FIG. 1 (Example 5) and FIG. 2 (Example 6). The glass ceramic of Example 5 has a gradient of only −1.2 ppb/$K^2$, and the glass ceramic of Example 6 has a gradient of −1.3 ppb/$K^2$. A value comparable with or even better than Zerodur® (CTE-T curve gradient of about −1.3 ppb/$K^2$ at the zero crossing) can therefore be achieved by the glass ceramics according to the invention.

Processing of the Glass Ceramics, Crystallite Sizes

Specimens of the glass ceramics according to Examples 1 to 6 were subsequently subjected to superpolishing. A good surface roughness of about 0.14 to 0.23 nm rms was achieved by this. The specimens were then subjected to a standardized ion beam figuring method for final processing. The HSFR roughnesses subsequently determined by AFM are given in Table 5.

TABLE 5

Roughness of samples in the examples, before and after IBF

| | Ex. 1 | Ex. 2 | Ex. 3 | Ex. 4 | Ex. 5 | Ex. 6 |
|---|---|---|---|---|---|---|
| average crystallite size [nm] | 48 | 54 | 44 | 43 | 44 | 48 |
| HSFR < 1 μm [nm rms] | | | | | | |
| before IBF | 0.16 | 0.18 | 0.15 | 0.18 | 0.16 | 0.18 |
| after IBF | 0.21 | 0.23 | 0.22 | 0.26 | 0.21 | 0.27 |

TABLE 6

Comparison with conventional glass ceramics

| | Zerodur ® | Zerodur ® M | Clearceram ® Z | Keralite ® |
|---|---|---|---|---|
| crystallite size [nm] | 60 | 50 | 38 | 35 |
| HSFR < 1 μm [nm rms] | | | | |
| before IBF | 0.10 | 0.13 | 0.13 | 0.10 |
| after IBF | 0.39 | 0.36 | 0.24 | 0.23 |

The crystallite sizes of the glass ceramics according to the invention, and of the said commercially available glass ceramics for comparison, as given in Tables 5 and 6 show that glass ceramics with very good surface qualities, i.e. both in terms of HSFR, MSFR and fine surface figure error, can be produced even with an average crystallite size >38 nm. A significantly improved surface quality compared with Zerodur® can therefore be produced with the glass ceramic, which has equally good CTE adjustability as Zerodur®. Compared with the glass ceramics according to the invention, the glass ceramics Keralite® and Clearceram®Z show inferior adjustability of the CTE and of the zero crossing of the CTE-T curve.

In particular, the ceramization of the glass ceramic is not restricted by the requirement that a particular value of the crystallite size should not be exceeded. This offers greater latitude in the ceramization, which can be exploited in order to adjust the expansion behaviour of the glass ceramic.

We claim:

1. An optical component comprising a substrate, said substrate comprising a glass ceramics which has a coefficient of thermal expansion CTE of from $-0.5\times10^{-6}$/K to $+0.5\times10^{-6}$/K in a temperature range of from 0 to 50° C., which is free of BaO, which is free of arsenic, and which has a composition, in % by weight based on oxide content, comprising:

| | |
|---|---|
| $SiO_2$ | 50–70 |
| $Al_2O_3$ | 17–32 |
| $P_2O_5$ | 3–12 |
| $Li_2O$ | 2.5–5 |
| $Na_2O$ | 0–2 |
| $K_2O$ | 0–2 |
| MgO | 0–2 |
| CaO | 0.1–4 |
| SrO | 0–2 |
| ZnO | 0–4 |
| $TiO_2$ | 1.5–5 |
| $ZrO_2$ | 0–2.5. |

2. The optical component according to claim 1, which is a mirror, in particular a normal incidence mirror or a grazing incidence mirror.

3. The optical component according to claim 1, which is a reticle mask.

4. The optical component according to claim 1, which is an X-ray optical component for EUV lithography.

5. A method for producing an optical component comprising the steps of:
providing a substrate for an optical element which comprises a glass ceramic which has a coefficient of thermal expansion CTE of from $-0.5\times10^{-6}$/K to $+0.5\times10^{-6}$/K in a temperature range of from 0 to 50° C.,
superpolishing the surface of the substrate to a surface roughness HSFR of at most 0.5 nm rms, and
processing the superpolished surface by a beam processing method to a fine surface figure error of at most 0.5 nm rms and a surface roughness MSFR of at most 0.5 nm rms, the surface roughness HSFR being substantially undeteriorated even after said processing has ended so as to still be at most 0.5 nm rms;
wherein said glass ceramic is free of BaO, free of arsenic, and has a composition, in percent by weight based on oxide content, comprising:

| | |
|---|---|
| $SiO_2$ | 50–70 |
| $Al_2O_3$ | 17–32 |
| $P_2O_5$ | 3–12 |
| $Li_2O$ | 2.5–5 |
| $Na_2O$ | 0–2 |
| $K_2O$ | 0–2 |
| MgO | 0–2 |
| CaO | 0.1–4 |
| SrO | 0–2 |
| ZnO | 0–4 |
| $TiO_2$ | 1.5–5 |
| $ZrO_2$ | 0–2.5. |

6. A glass ceramic having a coefficient of thermal expansion CTE of from $-0.5\times10^{-6}$/K to $+0.5\times10^{-6}$/K in a temperature range of from 0 to 50° C., and which is free of BaO, free of arsenic and which has a composition, in % by weight based on oxide content, comprising:

| | |
|---|---|
| $SiO_2$ | 50–70 |
| $Al_2O_3$ | 17–32 |
| $P_2O_5$ | 3–12 |
| $Li_2O$ | 2.5–5 |
| $Na_2O$ | 0–2 |
| $K_2O$ | 0–2 |
| MgO | 0–2 |
| CaO | 0.1–4 |
| SrO | 0–2 |
| ZnO | 0–4 |
| $TiO_2$ | 1.5–5 |
| $ZrO_2$ | 0–2.5. |

7. The glass ceramic according to claim 6, wherein said CTE is from $-0.3\times10^{-6}$/K to $+0.3\times10^{-6}$/K in said temperature range of from 0 to 50° C.

8. The glass ceramic according to claim 6, containing at least 0.5% by weight of said CaO.

9. The glass ceramic according to claim 6, containing not greater than 7.4% by weight of said $P_2O_5$.

10. The glass ceramic according to claim 6, having a CTE-T curve with at least one zero crossing in a temperature range of from 15 to 35° C.

11. The glass ceramic according to claim 10, wherein said CTE-T curve has a gradient $\leq 5$ ppb/$K^2$ at said at least one zero crossing.

12. The glass ceramic according to claim 6, further comprising at most 1% by weight of a total amount of refining agents selected from the group consisting of $Sb_2O_3$, SnO, $SO_4^{2-}$ and $F^-$.

13. The glass ceramic according to claim 6, which is lead-free.

14. The glass ceramic according to claim 6, wherein said CTE is from $-0.1\times10^{-6}$/K to $+0.1\times10^{-6}$/K in said temperature range of from 0 to 50° C.

* * * * *